No. 747,662. Patented December 22, 1903.

UNITED STATES PATENT OFFICE.

BENJAMIN TALBOT, OF HARROGATE, ENGLAND, ASSIGNOR TO CONTINUOUS METAL REFINING COMPANY, OF PHILADELPHIA, PENNSYLVANIA.

MANUFACTURE OF STEEL.

SPECIFICATION forming part of Letters Patent No. 747,662, dated December 22, 1903.

Application filed March 6, 1903. Serial No. 146,557. (No model.)

*To all whom it may concern:*

Be it known that I, BENJAMIN TALBOT, residing at Harrogate, in the county of York, England, have invented certain Improvements in the Manufacture of Steel, of which the following is a specification.

This invention relates to the process described in Letters Patent of the United States, No. 688,557, granted to me December 10, 1901, for effecting the rapid and early removal and combustion of carbon in the manufacture of basic steel. In the former process liquid iron is added to a bath of steel having a basic-slag covering containing metallic oxid capable of removing carbon in greater quantity than is required for oxidizing the carbon of the iron brought into contact therewith, carbonous-oxid gas is rapidly evolved, and this gas is burned to supplement the heating of the metal and facilitate the removal of the metalloids.

In the present invention a furnace is provided with a bath of steel impregnated with oxygen and covered with an oxidizing basic slag, and liquid iron containing carbon with more or less phosphorus and silicon is charged into this bath. In the reaction that takes place the metalloids are oxidized with great rapidity, the oxygen and the carbon combining very rapidly, effecting the deoxidation of the bath and the decarbonization of the iron accompanied by the evolution and combustion of carbonous oxid gas, by which a greatly-increased amount of heat is produced in the furnace and the metal is rapidly purified. The oxidation of the steel may be effected by dissolving in the bath iron oxids, added thereto or produced from the metal by the oxidizing action of the furnace-flame, and the oxidizing basic slag may be formed by additions of iron oxid with more or less lime, depending upon the quantity of phosphorus contained in the iron.

The iron may be either unrefined pig-iron or pig-iron that has been partially refined by a preliminary treatment in an open-hearth furnace, a mixer, or a Bessemer converter, the furnace or converter being provided with a basic, acid, or neutral lining, as required by the character of the metal to be treated.

If the iron is subjected to a preliminary treatment, there is preferably removed a substantial portion of the silicon, with part of the phosphorus and carbon, the carbon being preferably retained at approximately two per cent. to obtain the best results in the finishing-furnace. These preliminary reductions are effected by the oxidizing action of a flame and iron oxids, lime being used as required by the quantity of phosphorus to be removed.

The bath of steel in the finishing-furnace may be produced in any known manner, as by melting scrap or by heating together lime, iron oxid, scrap, and pig-iron, or by working down with oxids, scrap, and lime a charge of metal taken from the preliminary furnace, and the slag formed on the bath should be made of strongly-basic character by additions of iron oxids and lime prior to introducing the iron. This bath having been heated until sufficient oxids have been dissolved and the steel highly oxidized by infusion therefrom, unrefined or partially-refined liquid iron is added thereto, the carbon contained in the iron is rapidly combined with the oxygen of the bath and oxids contained in the slag, whatever silicon is contained in the metal is practically instantaneously oxidized, and the phosphorus is rapidly oxidized and removed with the carbon, the purification being facilitated by the heating effect of the reactions and the combustion of the carbonous oxid gas, which is advanced by admission of air preferably from the hot-air chambers. The charge being thus purified, it is brought to the particular composition and temperature required and the metal is tapped. To bring the steel to tapping condition, additions of solid or liquid pig-iron may be made to correct an overoxidized condition and to adjust the temperature.

The process contemplates not only combining a quantity of iron with a bath of oxidized steel, but also building up a complete charge by providing a furnace with a small portion of oxidized steel—say one-third of its total capacity—adding a portion of iron thereto, and bringing the product thus formed to the requisite condition of oxidation, and so on until the furnace is provided with its complete charge, when the metal is brought to the condition finally required, and either the whole or part of the steel is tapped, followed by a repetition of the cycle either as a continuous or intermittent operation. In carrying on the operation continuously upon the principle described in Letters Patent of the United States No. 599,290, granted to me February 15, 1896, when the complete charge has been brought to tapping condition a portion is poured off, leaving a pool of steel remaining in the furnace. This remaining steel is then brought to a highly-oxidized condition and provided with a covering of oxidizing basic slag for effecting the reduction of the impurities of further metal to be added thereto to complete the charge, and when the metal has been brought to tapping condition a part is tapped and the cycle repeated. The exhausted and impure slag is run off from time to time, and oxids and lime are added before introducing the iron to provide for the oxidation of the bath and to produce a slag of the desired character.

In order to burn a large amount of the carbonous oxid and obtain the greatest benefit therefrom, it is desirable to allow an interval of time between successive additions of iron.

A series of furnaces may be fed in rotation or otherwise from a single large preliminary furnace, and in this way a practically continuous supply of steel or ingot-iron of a uniform quality may be produced from a practically continuous supply of molten pig-iron running from the blast furnace or furnaces into the preliminary furnace and thence into the final refining-furnaces.

While the operations are preferably carried on in the basic open-hearth furnace, it will be understood that they may be conducted in other types of furnace provided with basic, neutral, or acid linings, depending upon the character of the metal and the amount of lime or other base used in the slag. It will also be understood that while the oxidized condition of the metal is preferably obtained by dissolving oxids in the bath it may be effected by blowing air into the metal of the bath, and an oxidizing slag of acid character may be employed when the metal is non-phosphoric or low in phosphorus. This mode of operation provides a store of heat in the bath in excess of that required for keeping the metal liquid, by which the temperature resulting upon the addition of pig-iron or unrefined metal is kept from falling to a point below that required for effecting the desired rapidity of reaction and a temperature is maintained sufficiently high for producing a rapid evolution and combustion of large volumes of carbonous oxid gas in the furnace. A further effect of the process is to prevent the formation of the seething porous slag of spongy texture and considerable thickness, which in other processes frequently forms and so insulates the metal from the heating action of the flame that the elimination of carbon is retarded and too slowly effected, although there may be ferrous oxid in the slag considerably in excess of that usually deemed necessary for the purpose of eliminating carbon. These operations, involving the storage of heat for maintaining high temperatures and alternately oxidizing and deoxidizing the bath, effect not only increased rapidity in the removal of carbon, but with the use of a calcareous slag as described the removal of phosphorus is also facilitated and the refining operations generally are advanced with material fuel economy.

By the term "oxidized steel-bath" as used in the claims I mean the product resulting from a steel-bath to which has been added oxid of iron in such quantity as to leave disseminated throughout such bath oxid of iron in sufficient quantity to react upon the unpurified iron to be added to the bath.

Having described my invention, I claim—

1. In the manufacture of steel the process which consists in producing an oxidized steel-bath, providing said bath with a basic slag, charging molten iron into said bath, decarbonizing the iron and deoxidizing the metal by combining the carbon of the iron with the oxygen in the bath, burning the evolved carbonous oxid gas and heating the charge thereby, substantially as specified.

2. In the manufacture of steel the process which consists in producing an oxidized steel-bath, providing said bath with an oxidizing basic slag, charging molten iron into said bath, oxidizing the carbon of the iron by combination with oxygen occluded in the bath and contained in the slag, burning the evolved carbonous oxid gas and heating the charge thereby, substantially as specified.

3. In the manufacture of steel the process which consists in producing an oxidized steel-bath, providing said bath with an oxidizing basic slag, charging molten iron into said bath, oxidizing the carbon of the iron by combination with oxygen held in the bath and contained in the steel, burning the evolved carbonous oxid gas and heating the charge thereby, and bringing the metal to the tapping composition and condition, substantially as specified.

4. In the manufacture of steel the process which consists in building up a furnace charge by adding successive charges of liquid iron to a steel-bath which is oxidized and provided with an oxidizing basic slag prior to the introduction of the successive charges of iron, substantially as specified.

5. In the manufacture of steel the process which consists in oxidizing a steel-bath and providing the same with a covering of oxidizing basic slag, charging molten iron into said bath, decarbonizing the iron and deoxidizing the metal by combining the carbon of the iron with the oxygen in the bath and in the slag, burning the evolved carbonous oxid gas and heating the charge thereby, bringing the metal to tapping composition and condition, tapping a portion of the metal, oxidizing the bath remaining in the furnace, and repeating the sequence described, substantially as specified.

6. In the manufacture of steel the process which consists in highly oxidizing a bath of steel, providing said bath with an oxidizing basic slag, charging molten iron having a substantial quantity of silicon removed therefrom into said bath of oxidized steel, and bringing the metal to tapping condition, substantially as specified.

7. In the manufacture of steel the process which consists in providing a furnace with a partial charge of molten steel, dissolving oxids in said bath until it becomes impregnated with oxygen, providing said bath with a strongly-oxidizing slag, charging iron containing a substantial quantity of carbon and a substantially reduced quantity of silicon into said bath, evolving and burning carbonous oxid gas, and bringing the metal to tapping condition in said furnace by admission of air thereto, substantially as specified.

8. In the manufacture of steel the process which consists in charging iron oxid and molten pig-iron into a preliminary furnace, eliminating a substantial quantity of the silicon from the iron without substantially decarbonizing it, charging the partially-purified iron into a finishing-furnace containing a bath of oxidized steel covered by an oxidizing slag, oxidizing the carbon and phosphorus of the added metal by means of the oxygen held in the bath and in the slag, and bringing the charge to tapping condition, substantially as specified.

9. In the manufacture of steel the process which consists in producing an oxidized steel-bath, providing said bath with an oxidizing-slag, charging molten iron into said bath, decarbonizing the iron and deoxidizing the metal by combining the carbon of the iron with the oxygen in the bath and in the slag, burning the evolved carbonous oxid gas and heating the charge thereby, substantially as specified.

10. In the manufacture of steel the process which consists in oxidizing a bath of steel and providing it with a temperature in excess of that required for keeping it fluid, providing a covering of oxidizing slag therefor, adding molten carbonaceous iron thereto, decarbonizing the iron and deoxidizing the bath by combining the carbon of the iron with oxygen of the bath and slag, burning the evolved carbonous oxid gas and heating the charge thereby, substantially as specified.

11. In the manufacture of steel the process which consists in oxidizing a steel-bath, providing said bath with a covering of calcareous slag and a temperature in excess of that required for keeping the metal fluid, charging molten iron containing carbon and phosphorus into said bath, and bringing the metal to tapping composition and condition, substantially as specified.

In testimony whereof I have hereunto set my hand, this 4th day of March, A. D. 1903, in the presence of the subscribing witnesses.

BENJAMIN TALBOT.

Witnesses:
THOMAS S. GATES,
UTLEY E. CRANE.